United States Patent
Mager

(10) Patent No.: US 6,790,273 B2
(45) Date of Patent: Sep. 14, 2004

(54) COMPOSITIONS COMPRISING INORGANIC UV ABSORBERS

(75) Inventor: Michael Mager, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/408,627

(22) Filed: Apr. 7, 2003

(65) Prior Publication Data

US 2003/0192457 A1 Oct. 16, 2003

(30) Foreign Application Priority Data

Apr. 11, 2002 (DE) .......................................... 102 15 941

(51) Int. Cl.⁷ ............................ C09D 5/32; C09D 7/00; C09D 183/00; B32B 9/04; B32B 27/06
(52) U.S. Cl. ............................ 106/287.13; 106/287.15; 427/419.5; 428/412; 428/447
(58) Field of Search ....................... 106/287.13, 287.15; 427/419.5; 428/412, 447

(56) References Cited

U.S. PATENT DOCUMENTS

| | | | |
|---|---|---|---|
| 4,799,963 A | * | 1/1989 | Basil et al. ............ 106/287.13 |
| 6,093,240 A | * | 7/2000 | Matsumura et al. ... 106/287.11 |
| 6,264,859 B1 | | 7/2001 | Basil et al. .................. 252/588 |
| 6,271,292 B1 | * | 8/2001 | Mager et al. ................ 524/261 |
| 6,395,826 B1 | * | 5/2002 | Mager et al. ................ 524/858 |
| 2002/0068793 A1 | | 6/2002 | Mager et al. ................ 524/858 |

FOREIGN PATENT DOCUMENTS

| | | |
|---|---|---|
| DE | 198 28 257 | 12/1999 |
| EP | 0 545 347 | 3/1995 |
| EP | 0 732 356 | 8/1996 |
| EP | 0 619 744 | 3/2002 |

OTHER PUBLICATIONS

Paint & Coatings Industry, (Jul. 2001) pp. 64–76, George Medford, "The Next Generation in Weatherable Hardcoats of Polycarbonate".

\* cited by examiner

Primary Examiner—David Brunsman
(74) Attorney, Agent, or Firm—Joseph C. Gil

(57) ABSTRACT

The present invention relates to compositions containing inorganic UV absorbers and to coatings produced therefrom for the long-term protection of materials, especially plastics, against photochemical degradation.

5 Claims, No Drawings

COMPOSITIONS COMPRISING INORGANIC UV ABSORBERS

BACKGROUND OF THE INVENTION

The present invention relates to compositions comprising inorganic UV absorbers and to coatings produced from them for the long-term protection of materials, especially plastics, against photochemical degradation.

Many materials such as plastics or natural substances (wood) must, for use outdoors, be protected against photochemical degradation by means of an appropriate coating. Appropriate primarily for this purpose is coating of the surface in a wet-chemical operation, although in the case of substantially two-dimensional substrates such as sheets of plastic it is also possible to achieve corresponding protection by coextrusion (on both sides) of a plastic which contains UV absorber. The wet-chemical application of a coating, particularly of an inorganic coating, however, has the advantage that it generally also enhances the chemical resistance and scratch resistance of the plastic. Coextrusion, although not providing these advantages, is nevertheless much easier to implement from a technical standpoint.

Both in the (wet-chemically) applied coatings and in the coextruded coats, it is common to use organic UV absorbers, which usually provide satisfactory protection of the underlying material (see, for example, Paint & Coatings Industry 2001, July, 64–76). In the case of very prolonged exposure to UV radiation (sunlight), however, organic UV absorbers are slowly degraded and so lose their protective effect. Through effects of weathering (humidity, high temperatures), moreover, there may be a loss of UV absorber through migration and leaching.

In contrast, inorganic UV absorbers such as titanium dioxide, cerium dioxide or zinc oxide, for example, do not have the disadvantages mentioned for organic UV absorbers. They are not photochemically degraded, and are neither leached out nor discharged under thermal loads.

If the particle size of the inorganic UV absorbers used is small enough, it is possible to produce highly transparent coatings from them. In principle, organic and inorganic binders can be used for this purpose. One example of the incorporation of nano-cerium dioxide into polyacrylates, which are then used as adhesion promoters on thermoplastics, is given in EP 0 732 356 A2. Because of the high surface area of titanium dioxide, cerium dioxide and zinc oxide nano-particles, however, there are frequent instances of photochemical damage and, ultimately, degradation of the matrix surrounding the inorganic UV absorbers. This then leads, among other consequences, to a loss of adhesion between coating and substrate (plastic).

This degradation can be prevented by using inorganic binders, especially sol-gel materials. The predominantly inorganic matrix is undamaged in the majority of cases by the photoactivity of the said nanoparticles.

Some UV protection formulations based on titanium dioxide, cerium dioxide and zinc oxide nanoparticles in sol-gel materials are now state of the art. For instance, U.S. Pat. No. 4,799,963 describes transparent coating compositions composed of partly hydrolysed (organic) alkoxides of the formula $R_xM(OR)_z$ and colloidal cerium dioxide, where R is an organic radical, x can be 0 but is smaller than z, and M stands for Si, Al, Ti or Zr or mixtures thereof. The compositions described in U.S. Pat. No. 4,799,963 have the disadvantage, however, that the mixtures of the organosilanes $CH_3Si(OC_2H_5)_3$ and $(CH_3)_2Si(OC_2H_5)_2$, Example 1, or of $CH_3Si(OCH_3)_3$ and $(CH_3)_2Si(OC_2H_5)_2$, Example 2, have solids contents of only about 6% by weight of nano-$CeO_2$, calculated on the basis of the fully hydrolysed and condensed methylalkoxy-silanes. When $Si(OC_2H_5)_4$ is used, in Example 3, the fraction of nano-$CeO_2$ achieved is indeed much higher, but the coatings produced therefrom are so brittle that they can be applied only to glass and not to plastic.

Additionally, by using the functional organosilane 3-glycidyloxypropyltrimethoxy-silane, Example 4, the amount of nano-$CeO_2$ in the solids can be raised only to about 13% by weight. Since the coatings described can only be applied in limited film thicknesses (cracking, flaking), the protection effect against relatively long-wave UV radiation (above about 300 nm) is so low, owing to the restricted amount of nano-$CeO_2$, that the substrate is not durably protected. Sunlight contains only UV radiation above about 300 nm, and so the protection effect above this figure is essential for all exterior applications.

DE-A 198 58 998 describes further coating compositions containing nano-$CeO_2$, which in addition to epoxy-functional silanes further comprise particulate boehmite, another hydrolysable silicon compound, and a hydrolysable aluminium compound. Although according to the examples it was possible to realize nano-$CeO_2$ contents of up to 25% in the coating compositions provided, and although weathering (Suntest) of correspondingly coated polycarbonate (Makrolon® 2808) exhibits a certain UV protection effect, the yellowing indices (YI) achieved are all above 3.5 and are therefore still too high for many applications.

EP 0 947 520 A1 describes mixtures of polyfunctional organosilanes with compounds containing aluminium and/or boron, which mixtures may further comprise inorganic particles such as particles, for example, of the oxides of the elements B, Al, Si, Ti, Zr and Ce. There is no reference whatsoever, however, to the suitability of such coatings for UV protection. In combination with nano-$CeO_2$, moreover, the great mechanical hardness and accompanying brittleness of the coatings gives them a strong propensity towards stress cracking under weathering, so making them unsuitable for exterior applications.

It is an object of the present invention, therefore, to provide UV protection formulations which following application to an appropriate substrate, such as plastic, can be cured to give transparent coatings and exhibit an effective and long-term UV protection effect while at the same time being highly stable to weathering.

DESCRIPTION OF THE INVENTION

It has now surprisingly been found that through the use of polyfunctional organosilanes it is possible to prepare UV protection formulations containing more than 15% by weight of nano-$CeO_2$ and that these formulations, even with a nano-$CeO_2$ content of 30% by weight or more, can be cured to give transparent coatings which display an effective and long-term UV protection effect while at the same time being highly stable to weathering.

The present invention accordingly provides compositions comprising, calculated on the basis of the solids, with complete hydrolysis and condensation, A) 30–85% by weight of at least one polyfunctional organosilane and
B) 15–70% by weight of nano-$CeO_2$, the compositions containing less than 0.1% by weight, preferably 0%, of an element from main group three of the periodic table or compounds of these elements.

The present invention further provides a process for preparing UV protection formulations containing 30–85% by weight of at least one polyfunctional organosilane and 15–70% by weight of nano-$CeO_2$, and also provides for their use for coating surfaces, especially surfaces of plastics.

Suitable polyfunctional organosilanes which may be used in UV protection formulations of the invention are monomers, oligomers and/or polymers, characterized in that at least 2 silicon atoms with hydrolysable and/or condensation-crosslinking groups are attached by way of, in each case, at least one SiC bond to a structural unit which links the silicon atoms. Due to their ready compatibility with nano-$CeO_2$, polyfunctional organosilanes having at least 3, preferably at least 4, silicon atoms with hydrolyzable and/or condensation-crosslinking groups are particularly suitable for the UV protection formulations of the invention. Particularly suitable hydrolyzable groups are alkoxy or aryloxy groups, mention being made preferably of alkyloxy groups, such as methyloxy, ethyloxy, propyloxy or butyloxy. Condensation-crosslinking groups are, in particular, silanol groups (Si—OH). Linking structural units in the context of the invention that may be mentioned include both individual atoms and also molecules. Molecular structural units can be, for example, linear or branched $C_1$–$C_{20}$ alkylene chains, $C_5$–$C_{10}$ cycloalkylene radicals or $C_6$–$C_{12}$ aromatic radicals, such as phenyl, naphthyl or biphenyl radicals, for example. These radicals may be singly or multiply substituted and may in particular also contain heteroatoms, such as Si, N, P, O or S, for example, within the chains or rings.

Coatings particularly stable to weathering are obtained if the linking structural unit of the polyfunctional organosilanes is composed of linear, branched, cyclic or cage-shaped carbosilanes, carbosiloxanes or siloxanes. Examples of such polyfunctional organosilanes are shown in the general formulae (I), (II) and (III).

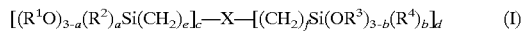  (I)

in which

R$^1$, R$^2$, R$^3$ and R$^4$ independently of one another stand for $C_1$–$C_8$ alkyl radicals or phenyl radicals, preferably methyl ethyl or phenyl radicals, a and b independently of one another denote 0, 1 or 2, preferably 0 or 1, and also c and d and, respectively, e and f independently of one another are greater than or equal to 1, preferably greater than or equal to 2, and X as a bridging structural unit stands for a linear, branched, cyclic or cage-shaped siloxane, carbosilane or carbosiloxane, preferably a cyclic or cage-shaped siloxane, carbosilane or carbosiloxane.

Particular preference is given to using cyclic carbosiloxanes of the general formula (II)

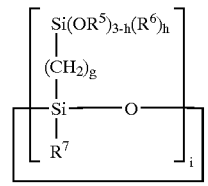  (II)

in which

R$^5$, R$^6$ and R$^7$ independently of one another stand for $C_1$–$C_4$ alkyl radicals, h stands for 0, 1 or 2, preferably 0 or 1, and also g stands for an integer from 1 to 4, preferably 2, and i stands for an integer from 3 to 10, preferably 4, 5 or 6.

By way of example, as cyclic carbosiloxanes, mention may be made of compounds of the formulae (IIIa) to (IIIe), in which R$^8$ stands for methyl or ethyl:

(IIIa) cyclo-{OSi[($CH_2$)$_2$Si(OH)($CH_3$)$_2$]}$_4$
(IIIb) cyclo-{OSi[($CH_2$)$_2$Si(OR$^8$)($CH_3$)$_2$]}$_4$
(IIIc) cyclo-{OSi[($CH_2$)$_2$Si(OH)$_2$($CH_3$)]}$_4$
(IIId) cyclo-{OSi[($CH_2$)$_2$Si(OR$^8$)$_2$($CH_3$)]}$_4$
(IIIe) cyclo-{OSi[($CH_2$)$_2$Si(OR$^8$)$_3$]}$_4$.

The oligomers of the stated cyclic carbosiloxanes, which are disclosed in WO 98/52992 (page 2), may of course likewise be used as polyfunctional organosilanes in the process of the invention. It is similarly possible to use mixtures of different cyclic monomeric or else oligomeric carbosiloxanes.

In order to produce transparent coatings it is necessary for the nano-$CeO_2$ used in the UV protection formulations of the invention to exhibit an average particle size of less than 100 nm, better still of less than 50 nm. The particle size distribution can be determined, for example, by ultracentrifugation. State of the art are aqueous or organic dispersions having the stated particle sizes and a concentration of up to 50% by weight. In particular, aqueous dispersions of nano-$CeO_2$, which where appropriate may also contain small amounts of dispersion stabilizers, are used advantageously to prepare the coating composition of the invention. Typical examples are dispersions of nano-$CeO_2$ having an average particle size of approximately 10–50 nm, a content of from 10 to 40% by weight, and an addition of an acidic dispersion stabilizer such as acetic acid in a concentration of approximately 1 to 10% by weight. Where necessary, the concentration of aqueous or organic nano-$CeO_2$ dispersions can be increased by means of customary techniques such as distillation.

The weight fractions of the polyfunctional organosilane, or of the mixture of corresponding organosilanes, and of the nano-cerium dioxide that are present in the UV protection formulation of the invention are calculated (not measured) and relate to the solids. In calculating the weight fraction of the polyfunctional organosilane, or of the mixture of corresponding organosilanes, it is assumed that hydrolysis of the hydrolysable groups to Si—OH groups is complete and that these groups then undergo complete condensation to form Si—O—Si bonds. The calculation of the solids content in the case of complete hydrolysis and condensation may be illustrated in the equation below for the polyfunctional organosilane (IIId) with R$^8$=ethyl.

882 g (1 mol) cyclo-{OSi[($CH_2$)$_2$Si(O$C_2H_5$)$_2$($CH_3$)]}$_4$+ 72 g (4 mol)$H_2O$→

585 g "cyclo-{OSi[($CH_2$)$_2$Si($O_{1/2}$)$_2$($CH_3$)}$_4$"+369 g (8 mol) ethanol Where, for example, in accordance with the above equation, 882 g of the polyfunctional organosilane (IIId) with R$^8$=ethyl and 300 g of nano-$CeO_2$ are used to prepare the mixture of the invention, the solids content of nano-$CeO_2$, following complete hydrolysis and condensation of the polyfunctional organosilane, is calculated as follows:

300 g/(300 g+585 g)*100=34% by weight nano-$CeO_2$.

For the hydrolysis and condensation product of the polyfunctional organosilane, correspondingly, it is the case that:

585 g/(585 g+300 g)*100=66% by weight "cyclo-{OSi[($CH_2$)$_2$Si($O_{1/2}$)$_2$($CH_3$)]}$_4$ Where, additionally, further compounds such as silicon alkoxides, for example, are used, of which a calculated solids of, for example, 20 g remains after complete hydrolysis and condensation, the fractions are calculated accordingly:

300 g/(300 g+585 g+20 g)*100=33.15% by weight nano-$CeO_2$, 585 g/(300 g+585 g+20 g)*100=64.64% by weight "cyclo-{OSi[$(CH_2)_2$Si($O_{1/2}$)$_2$($CH_3$)]}$_4$, and 20 g/(300 g+585 g+20 g)*100=2.21% by weight of other compound.

An analogous procedure is adopted with any further components that may be present.

In order to improve the mechanical properties, for example, the UV protection formulations of the invention may further comprise silicon alkoxides of the formula (IV), in which case the mixtures, calculated on the solids following complete hydrolysis and condensation, then contain the following weight fractions:

a1) 30–60% by weight of at least one polyfunctional organosilane b1) 15–40% by weight of nano-$CeO_2$ and c1) 0–35% by weight of at least one silicon alkoxide of the general formula (IV)

the compositions containing less than 0.1% by weight, preferably 0%, of an element from main group three of the periodic table, or compounds of these elements.

Preference is given to the following composition, containing:

a2) 40–60% by weight of at least one polyfunctional organosilane b2) 20–40% by weight of nano-$CeO_2$ and c2) 20–35% by weight of at least one silicon alkoxide of the general formula (IV)

the compositions containing less than 0.1% by weight, preferably 0%, of an element from main group three of the periodic table, or compounds of these elements.

The fraction of silicon alkoxide C) is calculated theoretically in analogy to the fraction of polyfunctional organosilane, as a fraction of the solid following complete hydrolysis, i.e. elimination of the hydrolysable alkoxide functions, and condensation.

The silicon alkoxides that may likewise be present in the mixtures of the invention correspond to the formula (IV) below $$(R^9)_a Si(OR^{10})_{4-a} \quad (IV)$$

in which a stands for 0, 1, 2 or 3, $R^9$ stands for an optionally substituted alkyl or aryl radical, and $R^{10}$ stands for a $C_1$ to $C_3$ alkyl radical.

Particularly preferred silicon alkoxides of the formula (IV) are those in which a stands for 0 or 1, $R^9$ stands for a methyl radical, and $R^{10}$ stands for a methyl or ethyl radical.

For example, mention may be made of the following silicon alkoxides of the formulae (Va) to (Vc), in which $R^{11}$ stands for a methyl or ethyl radical:

$Si(OR^{11})_4$
$CH_3$—$Si(OR^{11})_3$
$C_6H_5$—$Si(OR^{11})_3$.

For preparing the UV protection formulations of the invention, the polyfunctional organosilane, or the mixture of corresponding organosilanes, is first dissolved in an appropriate solvent and then hydrolyzed with water containing an acidic or basic catalyst. Finally, a predominantly aqueous dispersion of nano-$CeO_2$ is added and the pH of the resulting mixture is adjusted, where appropriate, by adding acid or base. All of the steps of the process are preferably carried out with stirring.

For preparing UV protection formulations of the invention which additionally comprise silicon alkoxides, a corresponding procedure is adopted; that is, the silicon alkoxide, or the mixture of corresponding silicon alkoxides, is first dissolved in an appropriate solvent together with the polyfunctional organosilane, or the mixture of corresponding organosilanes, then hydrolysis is carried out using water containing an acidic or basic catalyst, and finally a predominantly aqueous dispersion of nano-$CeO_2$ is added and the pH of the resulting mixture is adjusted, where appropriate, by adding acid or base. All of the steps of the process are preferably carried out with stirring.

The amount of water is chosen so that at least 10 mol %, preferably at least 25 mol %, of all hydrolyzable groups of the polyfunctional organosilane, or the mixture of corresponding organosilanes, and, where appropriate, of the additionally present silicon alkoxide or of the mixture of corresponding silicon alkoxides, can be hydrolyzed. Following the addition of the aqueous nano-$CeO_2$ dispersion, the resulting UV protection formulation preferably contains water in an amount such that the molar ratio of Si—OR to water is less than 2, preferably less than 1 and with great preference less than 0.5. Si—OR stands for a hydrolyzable group of a polyfunctional organosilane and/or of a silicon alkoxide.

Examples of suitable solvents which can be used for preparing the UV protection formulations of the invention are ketones, alcohols, esters and ethers, with alcohols being preferred. Examples of suitable alcohols that may be mentioned include methanol, ethanol, 1-propanol, 2-propanol, 1-butanol, 2-butanol, 1-pentanol and 1-methoxy-2-propanol, 1,2-ethanodiol and n-butyl glycol.

The amount of solvent used in the processes of the invention is such that the calculated solids content (after complete hydrolysis and condensation) of the UV protection formulations of the invention lies between 10 and 60% by weight, preferably between 25 and 50% by weight.

Suitable acidic and basic catalysts which can be used to hydrolyze polyfunctional organosilanes and silicon alkoxides are, in particular, Brönsted acids and Brönsted bases, Brönsted acids being preferred. Preference is given to using strong acids in a concentration of 0.05–1.0 mol/liter (water), both inorganic acids such as hydrochloric acid or sulphuric acid and organic acids such as p-toluenesulphonic acid being suitable.

In order, where necessary, to adjust the pH of the UV protection formulation prepared by one of the processes of the invention, this is achieved by adding an appropriate amount of a preferably weak acid or base. The resulting pH should thereafter be 4–8, considerably improving the stability of the UV protection formulations on storage.

The UV protection formulations of the invention can be used to produce coatings by applying them by conventional techniques to corresponding substrates and then curing them under appropriate conditions. Application may take place, for example, by dipping, flowcoating, spraying, knifecoating, pouring or brushing; thereafter, any solvent present is evaporated and the coating is cured at room temperature or an elevated temperature. Details on application by conventional methods can be found, for example, in Organic Coatings: Science and Technology, John Wiley & Sons 1994, Chapter 22, pages 65–82.

The coatings produced from the UV protection formulations of the invention afford good protection to the substrate against UV radiation and protect surfaces durably against photochemical degradation. They can therefore be employed wherever a UV-labile substrate is to be protected against UV radiation, primarily from sunlight or from an artificial radiation source. Many plastics, but also natural substances such as wood, may be durably protected against photochemical degradation by the coatings of the invention. The coating of glass, on the other hand, which is likewise possible, serves not to protect the substrate but instead to provide shielding from longwave UV radiation ($\geq 300$ nm), which passes almost completely through standard commercial window glass, for example.

As a result of their high transparency, the coatings of the invention can also be used in particular on transparent plastics such as polycarbonate, poly(meth)acrylate, polyester and polystyrene, and also copolymers and mixtures (blends) thereof. Polycarbonates, especially bisphenol A-based (aromatic) polycarbonates, are protected against UV radiation in a particularly advantageous fashion. Polycarbonates of this kind with long-term protection from UV radiation can then be used, for example, for glazing buildings and vehicles, where yellowing must be prevented over long periods of time.

In the case of thermoplastics it is possible in particular to coat extrudates and also injection moldings, in the form, for example, of films, sheets, and predominantly two-dimensional substrates.

In order to improve the adhesion it is naturally possible to use a suitable adhesion promoter, which ensures good adhesion of the coatings of the invention to the substrate. The adhesion promoter can be added to the mixture according to the invention or is applied as separate coating to the substrate.

Furthermore, the coatings obtained from the mixtures according to the invention may be overcoated with other coatings, which may serve, for example, to enhance the mechanical properties (scratch resistance).

EXAMPLES

The polyfunctional organosilane used in the experiments below was oligomeric cyclo-$\{OSi[(CH_2)_2Si(OC_2H_5)_2(CH_3)]\}_4$ ("D4 diethoxide oligomer"). It was prepared as described in U.S. Pat. No. 6,136,939, Example 2. Nano-$CeO_2$ was used in the form of a commercially available (Aldrich) 20% dispersion, stabilized with 2.5% by weight of acetic acid. The 0.1 N aqueous solution of p-toluenesulphonic acid used was prepared in-house by dissolving corresponding amounts of p-toluenesulphonic acid in a corresponding amount of water; all other starting materials were available commercially and were used without further purification. The mixtures were prepared using glass bottles of appropriate size, stirring being carried out using a magnetic stirring rod; the bottles were kept closed as far as possible.

The substrates used were extruded polycarbonate sheets of Makrolon® 3103 (Bayer AG, Leverkusen). Prior to coating, the sheets were cut to a format of 7.5×15 cm, cleaned by rinsing with isopropanol and provided with an adhesion promoter. The adhesion promoter, an alkoxysilane-modified polyurethane, was prepared as follows:

a) Preparation of the Polyol Component 9.24 g of Desmophen® 800 and 3.08 g of Desmophen® 670 were dissolved with stirring in 3.08 g of n-butyl acetate, after which 0.4 g of a 10% strength solution of zinc(II) octoate in diacetone alcohol, 0.2 g of a 10% strength solution of Baysilone® OL 17 in diacetone alcohol and 170.5 g of diacetone alcohol were added. This gave 186.5 g of the clear, colourless and storage-stable polyol component.

b) Preparation of the Polyisocyanate Component 462.4 g of Desmodur® Z 4470 (70% in n-butyl acetate) were diluted with 27.23 g of n-butyl acetate and then 60.4 g of N-butylaminopropyltrimethoxysilane were added dropwise over the course of approximately 2 hours at a rate such that the reaction temperature (internal thermometer) did not rise above 40° C. Cooling gave 550 g of the clear, pale yellow and storage-stable polyisocyanate component.

c) Preparation of the Ready-to-use Adhesion Promoter

The ready-to-use adhesion promoter was prepared by mixing 42.3 g of component a) and 7.7 g of component b) with stirring; the clear solution obtained was used within an hour.

(Desmophen® 800, Desmophen® 670 and Desmodur® Z 4470 are commercial products from Bayer AG, Leverkusen; Baysilone® OL 17 is a levelling additive from GE Bayer Silicones, Leverkusen; it is not critical to the invention and can be replaced by any other additive with a corresponding action).

The adhesion promoter prepared as described was applied by spincoating (2000 rpm, 20 sec holding time) followed by thermal treatment thereof at 130° C. for 60 minutes. The film thickness achieved in this way was typically about 0.3–0.6 $\mu$m.

The UV protection formulations of the invention were applied within one hour after curing of the adhesion promoter.

The UV protection formulations of the invention were applied by spincoating at different speeds. The figure stated is the maximum speed (in rpm); the holding time at maximum speed was in each case 20 seconds.

The UV protection effect of the coatings of the invention was tested by artificial weathering in accordance with ASTM G 154-97, Cycle 1, under the following conditions: 0.77 W/m²/340 nm, 8 h irradiation at 60° C. black panel temperature, 4 h condensation at 50° C. black panel temperature. The test is referred to below as the QUV-A test. An assessment was made of the appearance of cracks and also of the yellow value, as a measure of the degradation of the polycarbonate.

The invention is further illustrated but is not intended to be limited by the following examples in which all parts and percentages are by weight unless otherwise specified.

EXAMPLES

Example 1

Preparation of a UV Protection Formulation Containing 20% by Weight Nano-$CeO_2$ With stirring, 30.5 g of D4 diethoxide oligomer and 36.4 g of tetraethyl orthosilicate were dissolved in 54.1 g of 1-methoxy-2-propanol. After 5 minutes the mixture was then hydrolyzed with stirring using 5.1 g of 0.1 N p-toluenesulphonic acid solution, then again after 30 minutes of stirring with 5.11 g. After a further 60 minutes of stirring, 40.3 g of nano-$CeO_2$ dispersion (20%) were added; thereafter the mixture was stirred for 60 minutes and finally was left to stand at room temperature for 48 hours. This gave a clear, yellow mixture with (calculated) 20.8% by weight of nano-$CeO_2$ in the solids.

Example 2
Production of a Coating with the Mixture from Example 1

The mixture prepared in accordance with Example 1 was applied by spincoating (700 rpm) to polycarbonate sheets which had been provided with the adhesion promoter described. Flashing off at room temperature for 10 minutes and curing at 130° C. for 60 minutes gave an optical flawless coating which had a film thickness of about 3.2–3.5 µm.

Example 3
Suitability of the Coating from Example 2 as UV Protection for Polycarbonate Five polycarbonate sheets coated in accordance with Example 2 were subjected to a QUV-A test and were examined for damage (cracks, yellow value) after weathering periods of 250, 500, 750 and 1000 h. As is apparent from Table 1 below, the coatings of the invention gave an outstanding UV protection effect, i.e. there were no cracks and the yellow value b* was less than 2.

TABLE 1

| Sheet number | Visual assessment (cracks) | | | | Yellow value b* | | | |
|---|---|---|---|---|---|---|---|---|
| | 250 h | 500 h | 750 h | 1000 h | 250 h | 500 h | 750 h | 1000 h |
| 1 | none | none | none | none | 0.4 | 0.2 | 1.2 | 1.2 |
| 2 | none | none | none | none | 0.3 | 0.1 | 0.7 | 0.8 |
| 3 | none | none | none | none | 0.5 | 0.3 | 1.6 | 1.6 |
| 4 | none | none | none | none | 0.7 | 0.3 | 0.7 | 1.3 |
| 5 | none | none | none | none | 0.4 | 0.3 | 0.7 | 1.1 |

Example 4
Preparation of a UV Protection Formulation Containing 30% by Weight of Nano-$CeO_2$ First of all, the concentration of the commercially available nano-$CeO_2$ dispersion was raised from 20% by weight to 30% by weight by removal of water by condensation on a rotary evaporator.

Then, with stirring, 30.5 g of D4 diethoxide oligomer and 36.4 g of tetraethyl orthosilicate were dissolved in 54.1 g of 1-methoxy-2-propanol. After 5 minutes the mixture was then hydrolysed with stirring using 5.1 g of 0.1 N p-toluenesulphonic acid solution, and after 30 minutes of stirring again with 5.11 g. After a further 60 minutes of stirring, finally, 43.3 g of the nano-$CeO_2$ dispersion, concentrated as described (30%), were added; there after the mixture was stirred for 60 minutes and, finally, left to stand at room temperature for 48 hours. This gave a clear, yellow mixture with (calculated) 30.0% by weight of nano-$CeO_2$ in the solids.

Example 5
Production of a Coating with the Mixture from Example 4

The mixture prepared in accordance with Example 4 was applied by spincoating (700 rpm) to polycarbonate sheets which had been provided with the adhesion promoter described. Flashing off at room temperature for 10 minutes and curing at 130° C. for 60 minutes gave an optical flawless coating which had a film thickness of about 3.4 µm.

Example 6
Suitability of the Coating from Example 5 as UV Protection for Polycarbonate Five polycarbonate sheets coated in accordance with Example 5 were subjected to a QUV-A test and were examined for damage (cracks, yellow value) after weathering periods of 250, 500, 750 and 1000 h. As is apparent from Table 2 below, the coatings of the invention gave an outstanding UV protection effect, i.e. there were no cracks and the yellow value b* was less than 2.

TABLE 2

| Sheet number | Visual assessment (cracks) | | | | Yellow value b* | | | |
|---|---|---|---|---|---|---|---|---|
| | 250 h | 500 h | 750 h | 1000 h | 250 h | 500 h | 750 h | 1000 h |
| 1 | none | none | none | none | 0.2 | 0.2 | 0.5 | 0.5 |
| 2 | none | none | none | none | 0.0 | 0.0 | 0.2 | 0.2 |
| 3 | none | none | none | none | 0.0 | 0.0 | 0.2 | 0.4 |
| 4 | none | none | none | none | 0.1 | 0.2 | 0.4 | 0.4 |
| 5 | none | none | none | none | 0.1 | 0.1 | 0.4 | 0.5 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising, calculated on the basis of the solids, with complete hydrolysis and condensation, 30–85% by weight of at least one polyfunctional organosilane and 15–70% by weight of nano-$CeO_2$, the composition containing less than 0.1% by weight of an element from main group three of the periodic table or compounds of these elements.

2. In a process for coating a substrate by applying a composition to said substrate, the improvement wherein the compositions comprises the composition of claim 1.

3. The process of claim 2, wherein an adhesion promoter is applied to said substrate before said composition is applied.

4. Moldings and extrudates coated with the composition of claim 1.

5. A process for preparing a composition comprising dissolving a polyfunctional organosilane, or the mixture of the corresponding organosilanes, in a solvent, hydrolyzing the silane with water containing an acidic or basic catalyst and, adding a predominantly aqueous dispersion of nano-$CeO_2$ said composition comprising, calculated on the basis of the solids, with complete hydrolysis and condensation, 30–85% by weight of the polyfunctional organosilane and 15–70% by weight of nano-$CeO_2$, the composition containing less than 0.1% by weight of an element from main group three of the periodic table or compounds of these elements.

\* \* \* \* \*